(12) United States Patent
Rose et al.

(10) Patent No.: US 7,701,949 B1
(45) Date of Patent: Apr. 20, 2010

(54) SYSTEM AND METHOD FOR SWITCHING HIGH PRIORITY TRAFFIC WITH LOW LATENCY

(75) Inventors: Kenneth M. Rose, Palo Alto, CA (US);
David S. Walker, San Jose, CA (US);
Michael A. Benning, Roseville, CA (US); Mick R. Jacobs, Auburn, CA (US)

(73) Assignee: Cisco Technology, Inc., San Jose, CA (US)

( * ) Notice: Subject to any disclaimer, the term of this patent is extended or adjusted under 35 U.S.C. 154(b) by 1161 days.

(21) Appl. No.: 10/602,307

(22) Filed: Jun. 24, 2003

(51) Int. Cl.
*H04L 12/28* (2006.01)

(52) U.S. Cl. ............... 370/395.42; 370/60; 370/229; 370/412; 370/465

(58) Field of Classification Search ............ 370/60, 370/61, 229, 465–468, 412–416
See application file for complete search history.

(56) References Cited

U.S. PATENT DOCUMENTS

| | | | | |
|---|---|---|---|---|
| 4,980,820 A * | 12/1990 | Youngblood | ............ | 710/6 |
| 5,343,473 A * | 8/1994 | Cidon et al. | ............ | 370/465 |
| 5,371,849 A * | 12/1994 | Peaslee et al. | ............ | 345/553 |
| 5,497,371 A * | 3/1996 | Ellis et al. | ............ | 370/412 |
| 5,517,495 A * | 5/1996 | Lund et al. | ............ | 370/399 |
| 5,559,963 A * | 9/1996 | Gregg et al. | ............ | 709/234 |
| 5,634,015 A * | 5/1997 | Chang et al. | ............ | 710/310 |
| 5,757,795 A * | 5/1998 | Schnell | ............ | 370/392 |
| 5,790,522 A * | 8/1998 | Fichou et al. | ............ | 370/236 |
| 5,794,072 A * | 8/1998 | Nomura et al. | ............ | 710/40 |
| 5,812,534 A * | 9/1998 | Davis et al. | ............ | 370/260 |
| 5,933,435 A * | 8/1999 | Shah et al. | ............ | 714/749 |
| 6,044,061 A * | 3/2000 | Aybay et al. | ............ | 370/230 |
| 6,160,812 A * | 12/2000 | Bauman et al. | ............ | 370/416 |
| 6,185,221 B1 * | 2/2001 | Aybay | ............ | 370/412 |
| 6,449,283 B1 * | 9/2002 | Chao et al. | ............ | 370/461 |
| 6,463,067 B1 * | 10/2002 | Hebb et al. | ............ | 370/413 |
| 6,636,949 B2 * | 10/2003 | Barroso et al. | ............ | 711/141 |
| 6,650,651 B1 * | 11/2003 | Meredith et al. | ............ | 370/412 |
| 6,687,781 B2 * | 2/2004 | Wynne et al. | ............ | 710/317 |
| H2103 H * | 5/2004 | Modiano | ............ | 370/230 |
| 6,745,264 B1 * | 6/2004 | Luke et al. | ............ | 710/52 |
| 6,778,546 B1 * | 8/2004 | Epps et al. | ............ | 370/413 |
| 6,834,315 B2 * | 12/2004 | Johnson | ............ | 710/6 |
| 6,891,855 B2 * | 5/2005 | Bruckman | ............ | 370/468 |
| 6,952,401 B1 * | 10/2005 | Kadambi et al. | ............ | 370/232 |
| 7,145,869 B1 * | 12/2006 | Kadambi et al. | ............ | 370/229 |
| 7,230,917 B1 * | 6/2007 | Fedorkow et al. | ............ | 370/229 |
| 7,391,786 B1 * | 6/2008 | Prasad et al. | ............ | 370/412 |
| 2001/0030974 A1 * | 10/2001 | Pauwels | ............ | 370/444 |
| 2002/0041592 A1 * | 4/2002 | Van Der Zee et al. | ............ | 370/389 |
| 2002/0041595 A1 * | 4/2002 | Delvaux | ............ | 370/392 |
| 2002/0087716 A1 * | 7/2002 | Mustafa | ............ | 709/236 |
| 2002/0163922 A1 * | 11/2002 | Dooley et al. | ............ | 370/412 |

* cited by examiner

*Primary Examiner*—Ayaz R Sheikh
*Assistant Examiner*—Andrew C Lee
(74) *Attorney, Agent, or Firm*—Campbell Stephenson LLP

(57) ABSTRACT

An apparatus including a first buffer, a second buffer and a priority switch circuit. The first buffer is configured to store data of a first data stream having a first priority. The second buffer is configured to store data of a second data stream having a second priority. The priority switch circuit is coupled to the first buffer and the second buffer and is configured to interrupt a transmission of the first data stream from the first buffer upon detection of data of the second data stream and transmit data of the second data stream.

25 Claims, 6 Drawing Sheets

SYSTEM AND METHOD FOR SWITCHING HIGH PRIORITY TRAFFIC WITH LOW LATENCY

FIELD OF THE INVENTION

The present invention relates to communications devices, and more specifically, data frame transfer over switching fabrics.

BACKGROUND OF THE INVENTION

In a communications network, switching devices ("switches") receive data at one of a set of input interfaces and forward the data on to one or more of a set of output interfaces. Users typically require that such switching devices operate as quickly as possible in order to maintain a high data rate. Switches are typically data link layer devices that enable multiple physical network (e.g., local area network (LAN) or wide area network (WAN)) segments to be interconnected into a single larger network. In the most general sense, these types of networks transport data in the form of frames. Generally, a frame is a logical grouping of information sent as a data unit over a transmission medium. Frames typically include header and/or trailer information that surrounds user data contained in the unit. The terms cell, datagram, message, packet and segment are also used to describe logical information groupings at various layers of the Reference Model for Open Systems Interconnection ("OSI reference model") and in various technology circles. As used herein, the term "frame" should be understood in its broadest sense, and can encompass other terms such as cell, datagram, message, packet, and segment, and the like.

FIG. 1 illustrates a simplified block diagram of a switching network 100, such as a LAN switching network. In this example, a switch 102 includes switching fabric 110 and multiple line cards 120 and 130. Switch 102 connects various network devices 122, 124, 132, and 134 to each other through switching fabric 110 via line cards 120 and 130. Network devices 122, 124, 132, and 134 can, in general, include a variety of different devices including computer systems, output devices, storage devices, communications devices, or other network components such as routers, other switches, and even other networks.

It will be noted that the variable identifier "N" is used in FIG. 1 to more simply designate the final element (e.g., line card N 130) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Switching network 100 can employ one or more of a variety of different communication protocols enabling data communication between network devices. Line cards 120 and 130 generally take the form of an I/O interface card that typically performs data frame analysis as part of the switching process. Switching fabric 110 can also be implemented in a variety of ways. Three common types of switching fabrics are single-bus architectures, shared-memory architectures, and crossbars. Single-bus switching fabric architectures use a central fabric element within the switch to which all the ports of the switch communicate. Each port arbitrates for access to this fabric because there is one central switching element. With shared-memory architectures, a shared memory stores data frames and a high-speed ASIC reads and writes to the memory. Frames come into the architecture, a switching core places them in memory and then queues them to their outbound port. Buffering is internal to the switching fabric in this architecture, and buffers may be either fixed or dynamic. Crossbars use a mesh within the switching fabric to connect all the ports or all the line cards at high speed. Crossbars can be highly efficient for "balanced traffic," e.g., if port 1 and port 2 are communicating, and port 3 and port 4 are communicating then the crossbar directs those transmissions onto different paths.

It is increasingly desirable that switches support network administrative features including access control, accounting, quality of service (QoS), class of service (CoS) features, and other similar features. Accordingly, it is desirable to have data frame prioritization and interrupt techniques, and line cards and switch fabrics in support thereof, to provide additional features for network switches while allowing such switches to provide high bandwidth and throughput.

SUMMARY OF THE INVENTION

It has been discovered that network switching and/or routing devices can use multiple priority data streams and queues to support prioritized serial transmission of data from line cards (or the like) through a fabric switch to other line cards (or the like). Interruption logic is used to insert within any point of a data stream commands indicating a switch from one priority level data to another. Delimiter commands and combination switch/delimiter commands can also be used.

Accordingly, one aspect of the present invention provides an apparatus including a first buffer, a second buffer and a priority switch circuit. The first buffer is configured to store data of a first data stream having a first priority. The second buffer is configured to store data of a second data stream having a second priority. The priority switch circuit is coupled to the first buffer and the second buffer and is configured to interrupt a transmission of the first data stream from the first buffer to a switch fabric upon detection of data in the second buffer, and transmit data of the second data stream to the switch fabric.

Another aspect of the present invention provides a method. A first data stream is transmitted to a switch fabric. The first data stream has a first priority. Upon detection of a second data stream, the transmission of the first data stream is interrupted at any point in the transmission and a second data stream is transmitted to the switch fabric. The second data stream has a second priority.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
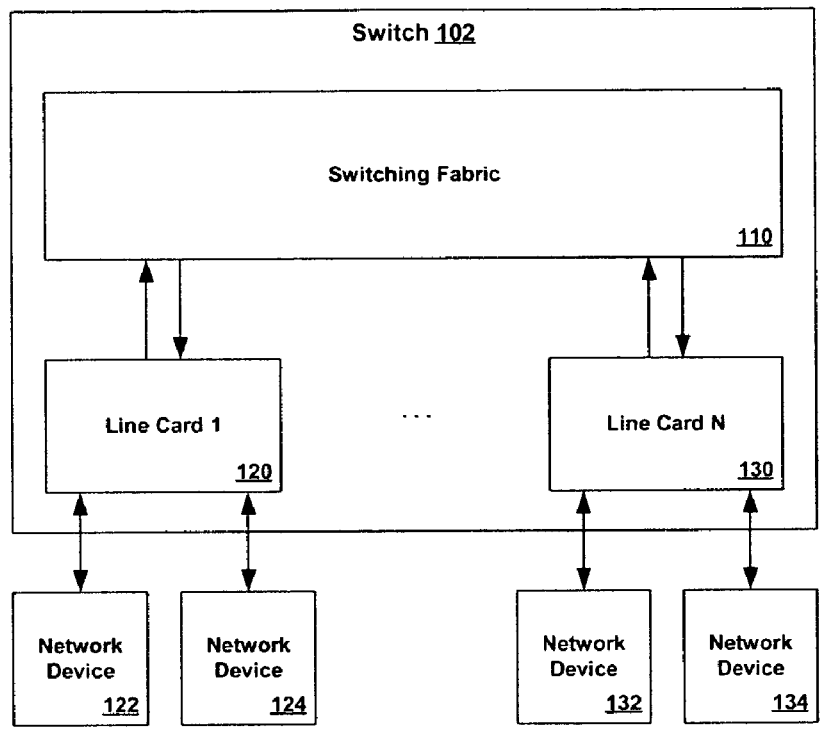
FIG. 1 illustrates a simplified block diagram of a switching network.
Figure 2:
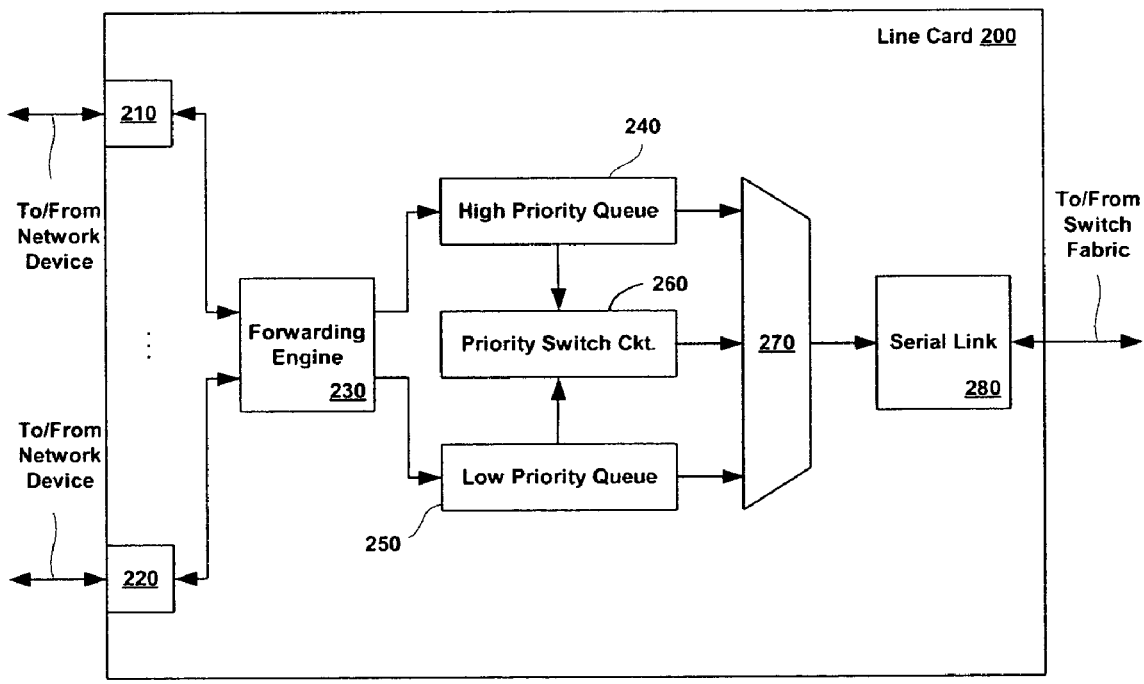
FIG. 2 illustrates a simplified block diagram of a line card supporting frame prioritization and interruption in accordance with the present invention.
Figure 9:
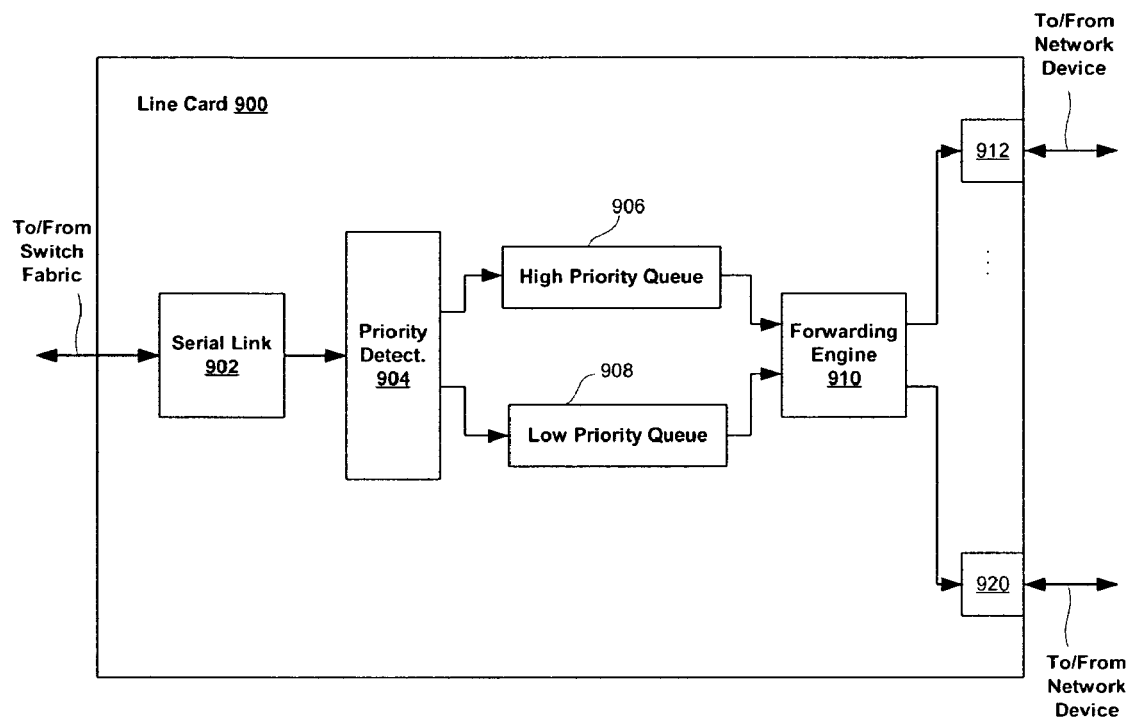
FIG. 9 illustrates a simplified block diagram of a line card supporting frame prioritization and interruption in accordance with the present invention.

FIG. 2 illustrates a simplified block diagram of a line card supporting frame prioritization and interruption. For convenience, FIG. 2 illustrates the "ingress" data path of the line card (i.e., the data path toward a switch fabric), while FIG. 9 illustrates the "egress" data path of the line card (i.e., the data path from a switch fabric). Those having ordinary skill in the art will recognize that typical line cards support both ingress and egress data paths.

Data frames arrive at a line card 200 from various network devices via I/O ports such as ports 210 and 220. A forwarding engine 230 analyzes at least a portion of the frames to determine each frame's priority. For example, frames associated with certain classes of data (e.g., voice) may have a higher priority than those frames associated with other classes of data (e.g., data). Thus, forwarding engine 230 can analyze a frame header to determine a corresponding data class and thereby classify the frame as high or low priority. It is noted that although the examples described herein focus on two priority levels, high and low, those having ordinary skill in the art will readily recognize that the devices and techniques of the present application can be extended to more than two priority levels. Additionally, those skilled in the art will recognize that boundaries between the functionality of the components described herein are merely illustrative. The functionality of multiple components may be combined into a single component, and/or the functionality of a single component may be distributed in additional components in accordance with the present invention. Moreover, alternative embodiments may include multiple instances of a particular component, and/or place components in different locations. For example, in one alternative embodiment, the forwarding engine resides on a separate circuit board coupled to multiple line cards.

Once a frame has been classified according to priority, the frame is forwarded to an appropriate queue, e.g., a high priority queue 240 or a low priority queue 250. Control signals from high priority queue 240 and low priority queue 250 notify a priority switch circuit 260 that frames are present in the respective queues. In an alternative embodiment, priority switch circuit 260 can directly monitor or poll the queues to determine if frames are present.

Priority switch circuit 260 determines when to send data of a particular priority, coordinates traffic transmission through a multiplexer 270, and provides control information so that the switching fabric can process the prioritized traffic accordingly. For example, if there are no high priority data frames in high priority queue 240 and there are low priority data frames in low priority queue 250, then priority switch circuit 260 forwards the low priority data from low priority queue 250. However, when there is high priority data in queue 240, priority switch circuit 260 temporarily stops transmission of the current stream of low priority data and transmits the high priority data. Once there is no more data in high priority queue 240 to transmit, transmission of data in low priority queue 250 resumes. In an alternative embodiment, priority switch circuit 260 does not forward data itself, but signals to another circuit, module, device, or the like to forward data. For example, priority switch circuit 260 can signal high priority queue 240 to forward data contained in high priority queue 240. Because there are only minor differences between each technique, "forwarding data" should be understood in its broadest sense. Additionally, it should be noted that line cards such as line card 200 generally include a variety of additional components in support of various frame processing and switching functions not described or illustrated in the present application.

Figure 3A:
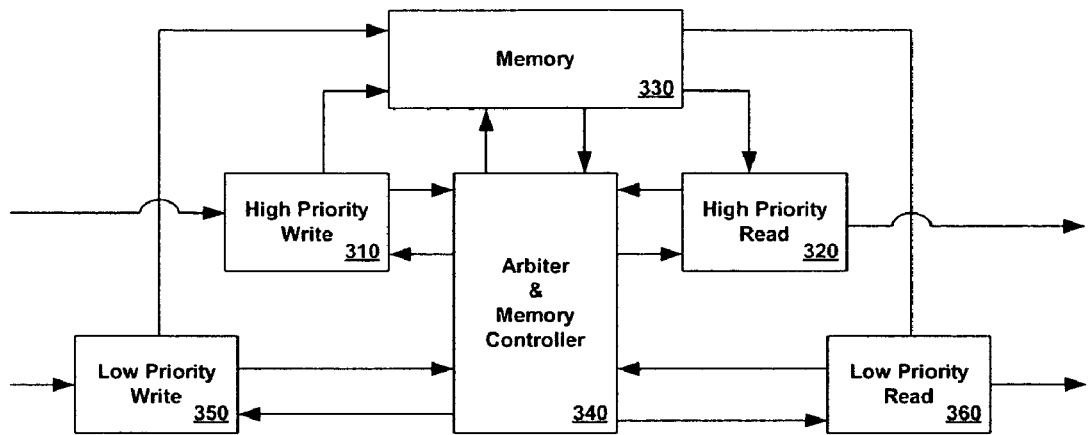
FIG. 3A illustrates a simplified block diagram of high and low priority queues used in accordance with the present invention.

FIG. 3A illustrates a simplified block diagram of high and low priority queues (e.g., low and high priority queues 240 and 250 of FIG. 2) used in accordance with the present invention. As illustrated in FIG. 3A, the two frame queues are constructed from several different logic blocks. A high priority write circuit 310 and a high priority read circuit 320 operate in conjunction with memory 330 and arbiter and memory controller 340 to provide a high priority frame queue. Similarly, a low priority write circuit 350 and a low priority read circuit 360 operate in conjunction with memory 330 and arbiter and memory controller 340 to provide a low priority frame queue. With dual queues it is possible to maintain two independently controlled flows. Stopping one flow does not stop the other flow, and a multiplexing protocol allows either the low or high priority data stream to be stopped while allowing the opposite stream to continue.

Figure 3B:
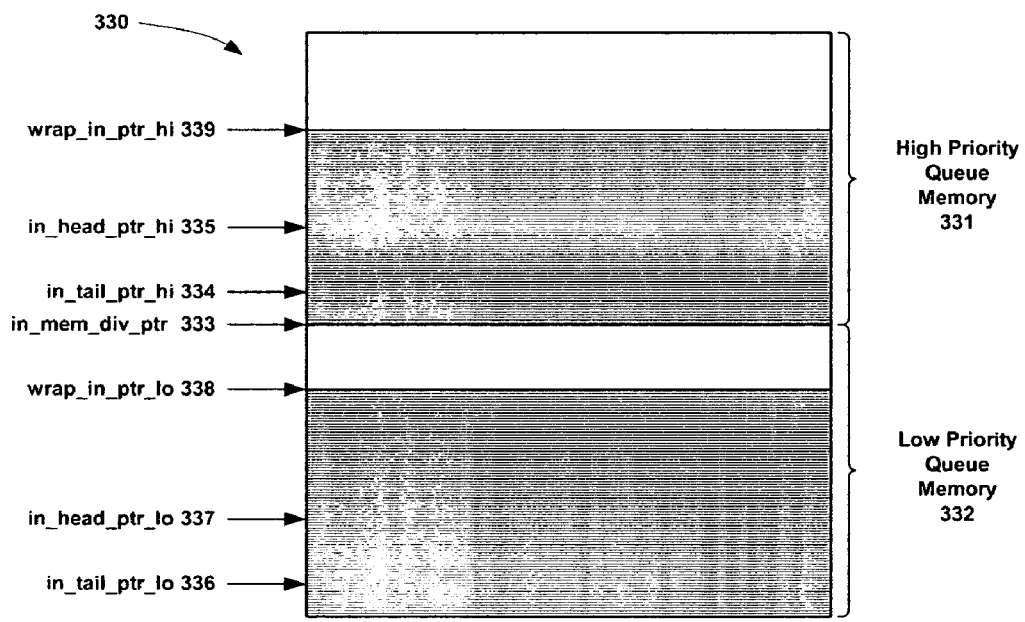
FIG. 3B illustrates an example of memory organization in support of the techniques of the present invention.

FIG. 3B illustrates an example of the organization of memory 330 to create both high and low priority queues. Memory 330 is logically divided into two queues: high priority queue memory 331 and low priority queue memory 332. The boundary between the two queues is set by a pointer, in_mem_divider_ptr 333. For each queue, two pointers describe boundaries of data currently stored in the queues. For high priority queue memory 331, a pointer in_tail_ptr_hi 334 describes the location of the next data frame (or portion thereof) to be removed from the queue and a pointer in_head_ptr_hi 335 describes the location where data is added to the queue. Similarly, for low priority queue memory 332, a pointer in_tail_ptr_lo 336 describes the location of the next data frame (or portion thereof) to be removed from the queue and a pointer in_head_ptr_lo 337 describes the location where data is added to the queue. A wrap_in_ptr_lo 338 and wrap_in_ptr_hi 339 are used to set the wrap point for the each of the two input buffer queues. These wrap points represent the addresses where each of the input buffer queues end. When the address pointer of one of the input buffer queues reaches the wrap pointer, the next location will be the first location of the respective queue. This scheme implements the high and low priority queues as circular FIFO buffers. Moreover, by efficiently using a single memory, the overall memory requirements of devices implementing the present invention (e.g., line card 200) can be reduced. Nevertheless, those having ordinary skill in the art will readily recognize that a variety of different buffering and memory organizing techniques can be used to implement the high and low priority queues.

Returning briefly to FIG. 2, data from line card 200 is passed on to a switching fabric after being serialized by serial link 280. Because, in the presently described embodiment, data is serially transported from line card 200 to the switching fabric, both high and low priority traffic cannot be simultaneously transported. Accordingly, to distinguish high priority data from low priority data, a switch code is inserted into the data stream indicating the change from low priority data to high priority data. (Serial transport across a backplane is typically used because of its speed and relatively small number of signal lines.) While prior transmission schemes might simply insert a delimiter between complete frames, regardless of priority, FIGS. 4A and 4B illustrate two techniques for multiplexing at least two data streams of different priorities.

Figure 4A:
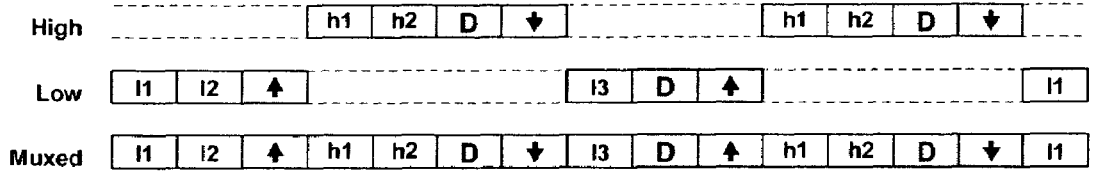
FIGS. 4A & 4B illustrate prioritized data streams including switch codes and delimiters in accordance with the present invention.
Figure 4A:
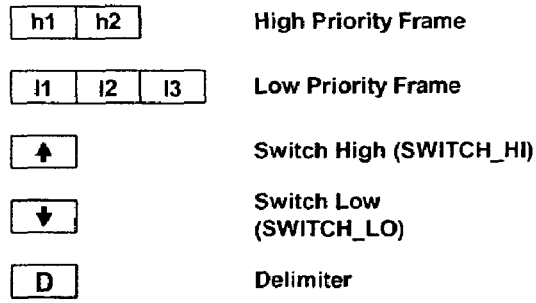
Figure 4B:
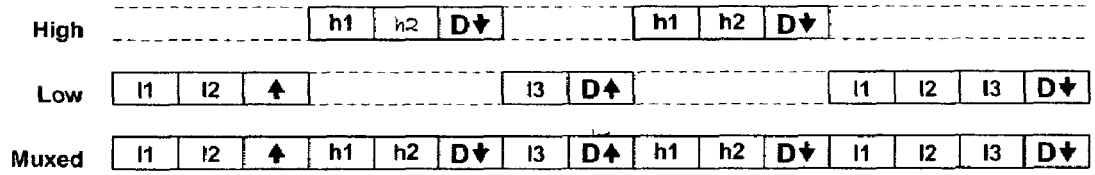
Figure 4B:
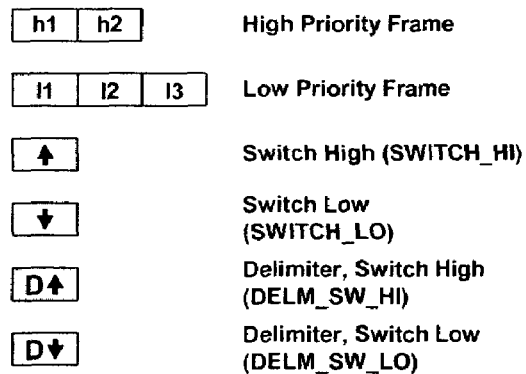

As illustrated in FIG. 4A, a delimiter code and two switch codes (SWITCH_HI and SWITCH_LO) can be used. The SWITCH_HI code informs the receiver that following data belongs to the high priority data stream. The SWITCH_LO code informs the receiver that following data belongs to the low priority data stream. The transmitter can generally switch between data streams at any time within frames or between frames. FIG. 4A shows the transmission of two high priority frames and two low priority frames. Each high priority frame is made up of portions h1 and h2, while each low priority frame is made up of portions 11, 12, and 13. Although h1 and h2 are shown to repeat, each portion can be different (e.g., different bytes of data). Similarly for a low priority frame, each portion 11, 12, and 13 can be different. Further, to aid in clarity, a high priority frame is illustrated as made up of two portions, while a low frame is made up of three portions. It is recognized that each frame can be made up of any number of portions.

The multiplexed (muxed) data stream begins with a low priority frame. Before the low priority frame is complete, the transmitter suspends the low priority frame by switching to the high priority data stream. The complete high priority frame is sent, followed by the delimiter code marking the end of the high priority frame. A SWITCH_LO command follows indicating that transmission of the low priority data stream can proceed.

In another embodiment, low priority data is sent during periods when there is no high priority data to send. For example, if for some reason, high priority data stopped arriving before the end of the high priority packet, the transmission of low priority data would resume using the SWITCH_LO code. The transmission of high priority data would resume (with the SWITCH_HI code) as soon as high priority data was available.

In the example of FIG. 4A, frame boundary delimiters are used in conjunction with switch commands. However, to reduce bandwidth requirements, delimiters can be combined with switch commands as shown in FIG. 4B. At the end of a complete frame where the priority level of the next frame will be different, a DELM_SW_HI or DELM_SW_LO code is added. The DELM_SW_HI code tells the receiver that high priority data follows. The DELM_SW_LO code tells the receiver that low priority data follows. These codes indicate to a receiver that the last portion of a frame (either preempted or not) has been transmitted. To further allow arbitrary multiplexing of high priority data and low priority data, switched data can also be marked with priority switch codes. For example, if, while a low priority frame is being transmitted to the switching fabric, priority switch circuit 260 determines or learns that a high priority frame (either a complete high priority frame or any portion of a high priority frame) is available and must be transmitted, the switching point of the paused low priority frame is marked with a SWITCH_HI code. The SWITCH_HI code tells the receiver that high priority data follows. But, unlike the DELM_SW_HI code, the SWITCH_HI code does not indicate that the preceding data was the end of a frame. Thus, a device receiving the SWITCH_HI code would know that a portion (e.g., the remainder) of the interrupted low priority frame should be received at some point after the high priority transmission is complete. In a similar manner, a SWITCH_LO code tells the receiver that low priority data follows. In a further example, SWITCH_LO codes are not utilized because the system is designed to transmit complete high priority frames only, i.e., high priority frames are not interrupted. In general, these codes are not part of the frame itself, but are separate data blocks or messages transmitted to the switching fabric.

Priority switch circuit 260 generates the appropriate codes and controls the flow of frames and control code insertion via multiplexer 270. As will be seen below, a similar scheme is used by the switching fabric to provide priority information to line cards that receive data transmissions from the fabric. Additionally, the control codes can be inserted into the "to-fabric" data stream using a variety of other techniques.

To ensure that high priority data traffic does not starve low priority traffic, the present invention implements a technique to guarantee a minimum level of service to data other than high priority data. To guarantee such a minimum level of service, a number of different algorithms and techniques can be implemented. In one example, a leaky bucket mechanism is used. The leaky bucket mechanism includes a token buffer with a predetermined maximum buffer size. Tokens are generated at a specific rate depending upon the desired minimum level of service. A data frame (in this case a low priority data frame) cannot be transmitted to the fabric switch until the frame has secured a token from the token buffer. In the context of the above-described interruption mechanism, securing a token would also authorize a low priority frame to interrupt a high priority frame. Such a technique can be implemented as part of priority switch logic 260. A variety of other techniques can also be utilized to guarantee some level of service to low priority frames including: the use of a time-out feature forcing a programmable number of bytes of low priority data to be transmitted after a certain period elapses, the use of a high priority byte counter forcing low priority data to be transmitted after a certain number of bytes of high priority data are transmitted with no intervening low priority transmission, and the like.

Data from a data stream is placed in to memory 330 as it arrives, and a counter (not shown) is used to keep a count of the number of complete frames in memory (e.g., the counter increments a count upon detection of an end of packet). Note that control codes are typically not accumulated and stored in respective queues.

Arbiter and memory control 340 receives high and low priority read and write requests from four inputs. In one implementation, write requests generally have priority over read requests, and high priority read requests and write requests have priority over low priority read requests and write requests respectively.

The presence of frames in the queues can be monitored by high priority read circuit 320 and low priority read circuit 360 in a number of ways. In one embodiment, separate counters track the number of frames in each queue. Arbiter & memory controller 340 and/or high priority read circuit 320 and low priority read circuit 360 monitor the counters. When either of the counters is non-zero, the appropriate read circuit sends some or all of the frames to its corresponding port of the switch fabric.

Figure 5:
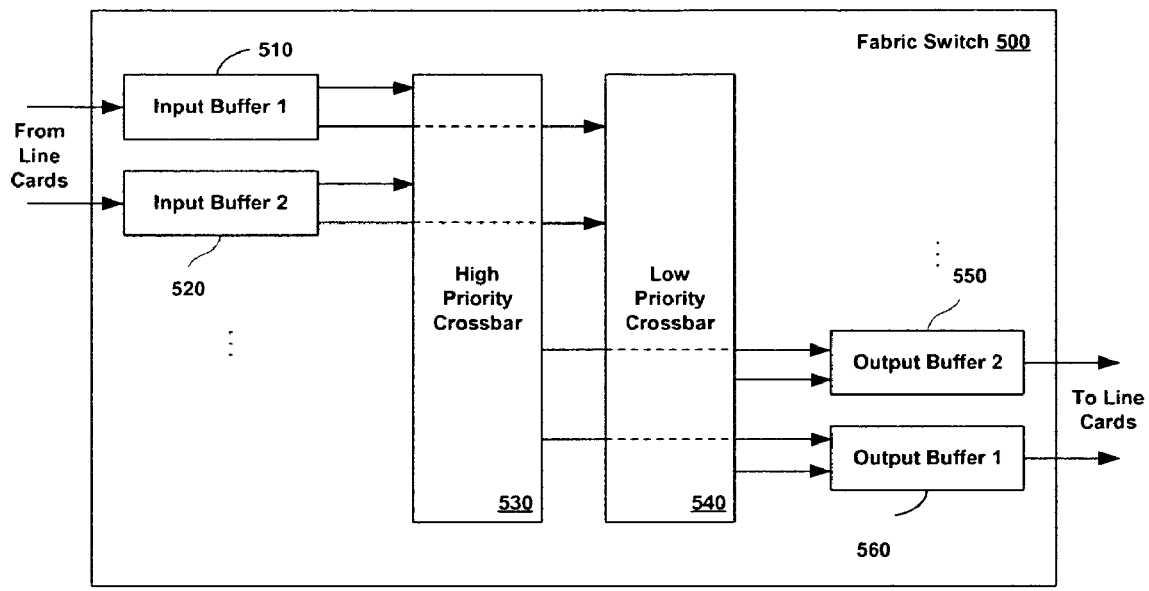
FIG. 5 illustrates a simplified block diagram of a fabric switch.

FIG. 5 illustrates a simplified block diagram of a fabric switch. Data frames from various line cards are forwarded to fabric switch 500 and received at input buffers 510 and 520. In general, there is an input buffer for each line card supported by fabric switch 500. Because fabric switch 500 is designed to support both high and low priority traffic, each input buffer separates high and low priority data frames from the serialized data stream received from the line cards. High priority data frames are forwarded to a high priority crossbar 530 for transmission to an appropriate output buffer, e.g. output buffers 550 and 560. As is the case with input buffers, there is typically one output buffer for each line card supported by fabric switch 500. Low priority data frames are also transmitted from input buffers 510 and 520 to a low priority crossbar 540 for transmission to an appropriate output buffer. Thus, fabric switch 500 switches high priority and low priority traffic separately.

In one embodiment, fabric switch 500 takes input frames from any port and stores them fully within that port's input buffer. From there, fabric switch 500 arbitrates for the output buffer(s) designated by embedded data fields within the received frames. For example, a port of exit (PoE) can be designated by one or more bits in the frame of data. The fabric switch transfers a frame to an output buffer corresponding to the port designated by the PoE bits. Multiple PoE bits can be asserted to send a frame to multiple destinations. After the arbitration is finished the data will flow from the input buffer memory to the output buffer memory. After frames are fully received within the output buffer, the frame can then be moved across the output port to the destination line card and on to a destination network device.

In some implementations, multiple fabric switches 500 are used so that a larger number of line cards and/or greater bandwidth can be supported. In such implementations, each of the fabric switches is synchronized so that data transfer across respective crossbars occurs approximately simultaneously. Synchronization and de-skew circuitry can be provided as separate circuits, e.g., not part of a fabric switch ASIC, between the line cards and the fabric switch, or such circuits can be provided as part of the fabric switch circuit itself. Additionally, one of the multiple fabric switches can be designated as a master while the others are slaves. In such an example, fabric switch header information, e.g., port of exit information, is always received by the master fabric switch. The master fabric switch makes all decisions and communicates those decisions to the slave fabric switches via a synchronization bus.

In the event that a burst of traffic is too great for the combined fabric input and output buffering, a flow control mechanism causes the necessary discarding (of low priority packets) to occur at the fabric input buffers attempting to send to the congested fabric output buffer. Since there are two separate data paths for high and low priority packets, bursts of low priority congestion have little affect on the high priority throughput. Also the high priority traffic volume is assumed to be low enough to avoid congestion.

In still additional implementations, support exists for additional priority levels, e.g., medium priority. In such implementations, additional corresponding crossbars can be included. Alternately, line cards supporting additional priority levels that are not supported by the fabric switch can dequeue frames from its queues and map them into the two logical data streams supported by the fabric switch's buffers.

Figure 6:
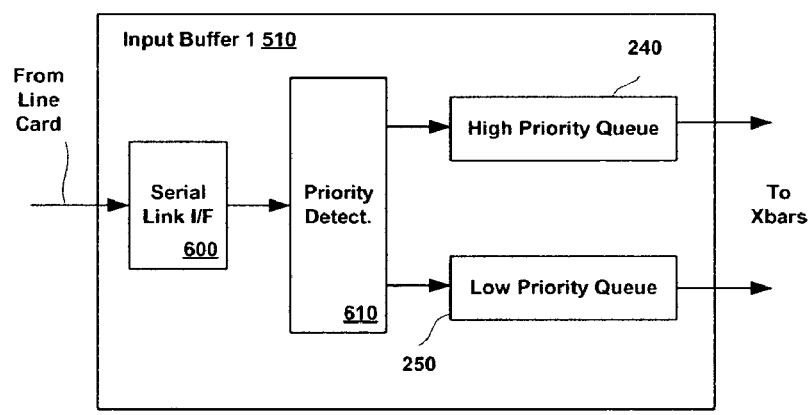
FIG. 6 illustrates a simplified block diagram of an input buffer of the fabric switch of FIG. 5.

FIG. 6 illustrates a simplified block diagram of one embodiment of input buffer 610. Input buffer 610 is used to store incoming frames sent by one or more line cards. Serialized data arrives from a line card at serial link interface 600. Serial link interface 600 is responsible for de-multiplexing and re-forming incoming data into frames or portions thereof. Priority detection circuit 610 separates high priority frames from low priority frames and forwards packets to either high priority queue 240 or low priority queue 250. In the presently described embodiment, high priority queue 240 and low priority queue 250 are implemented as illustrated in FIG. 3A, with two frame queues constructed from several different logic blocks.

Priority detection circuit 610 monitors the data stream for priority level control codes, e.g., the aforementioned SWITCH_HI, SWITCH_LO, DELM_SW_HI, and DELM_SW_LO codes, so as to separate the combined low and high priority streams into two distinct streams. Both control codes and data pass through unchanged to appropriate priority level receive state machines. In a typical implementation, priority detection circuit 610 monitors only those codes that switch between the two low and high priority streams. Whenever a stream-switching code is encountered, priority detection circuit 610 switches to the specified stream beginning with data following the stream switching code. As noted above, a switch can happen anywhere within a frame or between frames.

Figure 7:
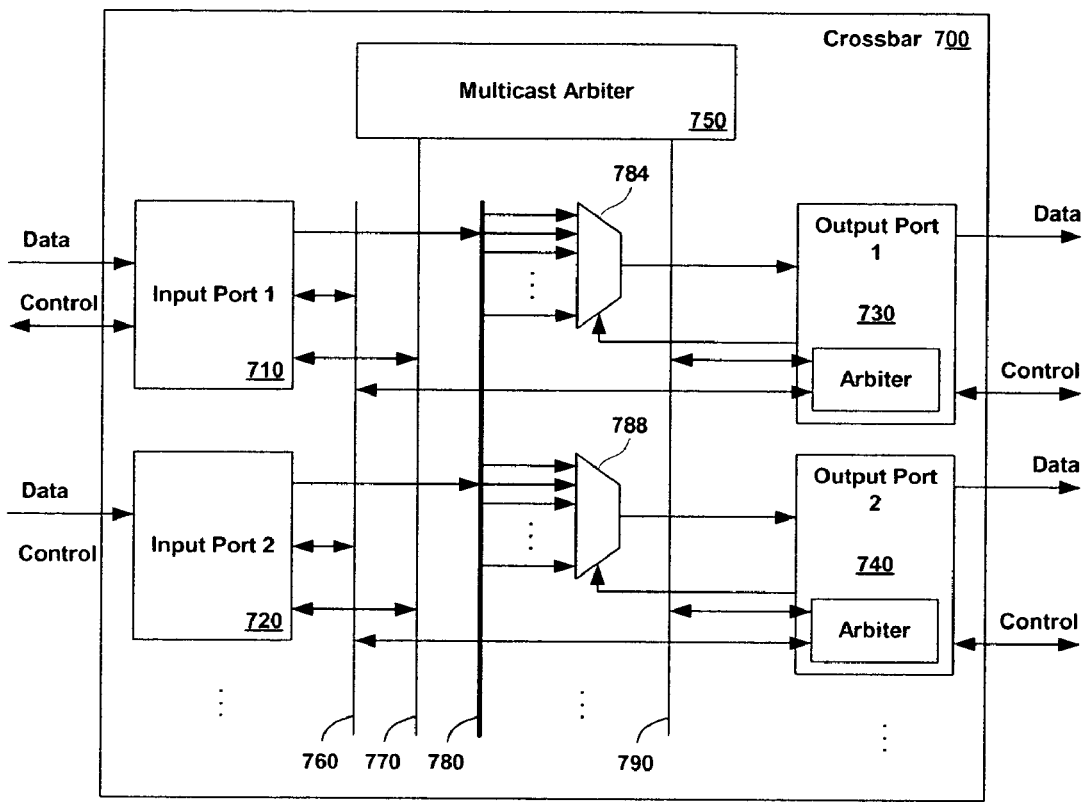
FIG. 7 illustrates a simplified block diagram of a crossbar.

Crossbar 700, e.g., a crossbar such as high priority crossbar 530 or low priority crossbar 540, is illustrated in FIG. 7. Each input port module (e.g., 710 and 720) receives frames (or portions thereof) from a switch fabric input buffer (e.g., 510 and 520). As noted above, the input buffers typically extract PoE information from frames and request frame transfer to the appropriate output port. Each output port module (e.g., 730 and 740) includes an arbiter circuit that controls access to that output port module. When an arbiter acknowledges a requested transfer, a corresponding input port module sends a frame into the crossbar. The output port module that acknowledged the transfer receives the frame and sends it on to an output buffer such as output buffer 550 or 560. Interconnection of input ports and output ports in crossbar 700 is achieved using data bus 780; arbitration buses 760, 770, and 790; and multiplexers such as multiplexers 784 and 788.

For frames destined for a single network location, i.e., unicast frames, an input port module makes arbitration requests directly to the arbiter of the destination output port via unicast arbitration bus 760. For frames having multiple network destinations, i.e., multicast frames, an input port module makes arbitration requests to a central multicast arbiter 750 via multicast arbitration bus 770. Multicast arbiter 750 arbitrates among all requesting input port modules and passes control signals (via multicast arbitration bus 790) to the appropriate output port module arbiters. In either case, the output port module(s) return the acknowledge signal(s) directly to the source input port modules.

As illustrated, crossbar 700 performs no priority based switching, that is the crossbar is generally unaware whether its traffic is high priority or low priority traffic. Thus, crossbars 530 and 540 of FIG. 5 can be implemented using two separate instances of the same crossbar circuit, e.g., crossbar 700. The only difference being the input buffer (and output buffer) queues to which the crossbars are connected.

Figure 8:
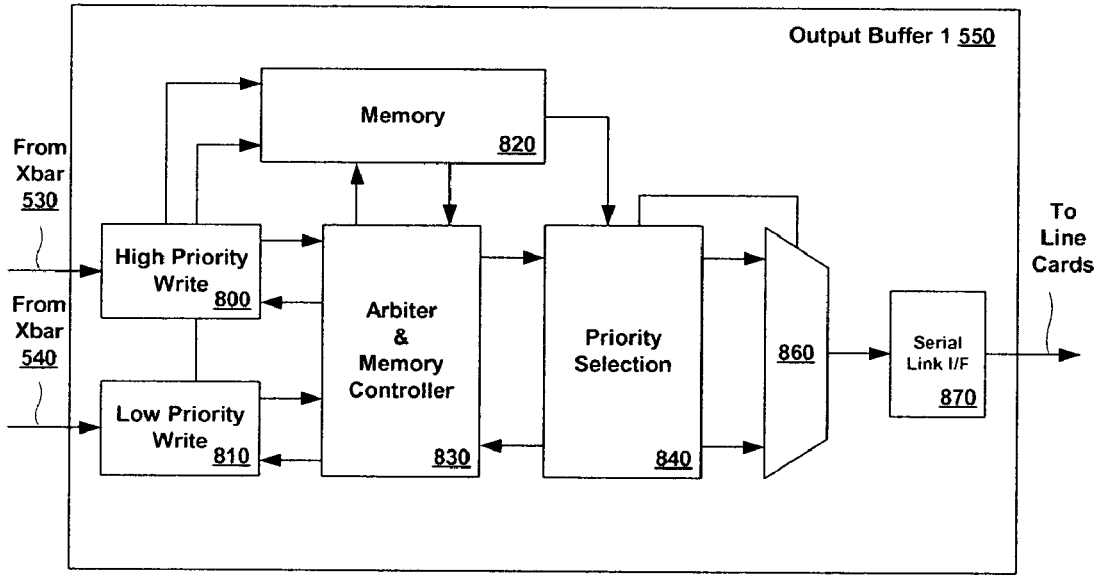
FIG. 8 illustrates a simplified block diagram of an output buffer of the fabric switch of FIG. 5.

The final step across switch fabric 700 is to one or more output buffer modules, such as modules 550 and 560. FIG. 8 illustrates a simplified block diagram of output buffer 550. Output buffers are used as multi-frame queues to store high and low priority data stream from corresponding crossbars before the frames are multiplexed in one data stream for transmission to a line card. As with the input buffers, each output buffer supports both low and high priority data to optimize output port low and high priority traffic flow. The low and high priority buffers can be accessed independently to enable the stopping of one flow without affecting the other flow. Output buffers will typically transfer all high priority frames first and then transfer any low priority frames.

Data destined to the output buffer queues arrives from the crossbars via low and high priority buses. Data from the two priority buses is accumulated to one or more memory words at which time the appropriate write circuit (high priority write 800 or low priority write 810) writes the data to memory 820 in conjunction with arbiter and memory controller 830. In one embodiment, the output buffer will drop all data sent to it if the data cannot be stored within memory 820. Data will only start being stored within memory 820 when the beginning of a frame has arrived and there is room in memory 820 for the transfer. If memory 820 runs out of room while receiving a frame, the transfer will be terminated and appropriate control bits set. This abnormally terminated frame will be sent to the line card, which will perform requisite verification, e.g., a CRC verification. In this example, the line card will determine that there is an error in the frame and the frame will be dropped.

A variety of different queue structures can be implemented in support of the high priority and low priority queues. As illustrated, memory 820 can be organized in much the same fashion as memory 330 described above and illustrated in FIG. 3A.

Arbiter and memory controller 830 receives high and low priority read and write requests from four inputs. In one implementation, write requests generally have priority over read requests, and high priority read requests and write requests have priority over low priority read requests and write requests respectively.

The presence of frames in the queues can be monitored by priority selection circuit 840 and/or arbiter and memory controller 830 in a variety of ways. In general, priority selection circuit 840 includes functionality much like that of high priority read circuit 320 and low priority read circuit 360 as shown in FIG. 3A. In one embodiment, separate counters track the number of frames in each queue. Arbiter & memory controller 830 and/or priority selection circuit 840 monitor the counters. When either of the counters is non-zero, the appropriate read circuit sends some or all of the frame to its corresponding line card. In an alternate embodiment, only a high priority queue frame counter is maintained. The single counter is monitored so that high priority frames are services first. When the counter is zero, low priority frames are processed. Since output buffer 550 transmits data to a line card, the data is serialized using serial link interface 870.

In order to retain priority information for each of the frames that is multiplexed onto a serial link between output buffer 550 and a line card, control codes similar to those discussed above in the context of FIG. 4 are utilized. Priority selection circuit 840 determines when to send a particular priority of data traffic, coordinates traffic transmission through multiplexer 860, and provides control information so that a line card receiving the data stream can determine the priority level of the traffic being transmitted and process the traffic accordingly. For example, if there are no high priority data frames in the high priority queue, then priority selection circuit 840 forwards data from the low priority queue. When there is high priority data, priority selection circuit 840 interrupts the current stream of low priority data and transmits the high priority data. Because both low and high priority data are transmitted over the same serial link and it is most desirable to be able to arbitrarily preempt a low priority frame, i.e., interrupt transmission at any point during the transmission of a frame, a delimiter is inserted into the data stream indicating the change from low priority data to high priority data.

In one example, several different delimiters can be utilized. At the end of a complete frame where the priority level of the next frame will be different, a DELM_SW_HI or DELM_SW_LO code is added. The DELM_SW_HI code tells the receiver that high priority data follows. The DELM_SW_LO code tells the receiver that low priority data follows. These codes indicate to a receiver that the last portion of a frame (either preempted or not) has been transmitted. To further allow arbitrary multiplexing of high priority data and low priority data, switched data can also be marked with priority switch codes. If, while a low priority frame is being transmitted to the switching fabric, priority selection circuit 840 determines or learns that a high priority frame is available and must be transmitted, the switching point of the paused low priority frame is marked with a SWITCH_HI code. The SWITCH_HI code tells the receiver that high priority data follows. But, unlike the DELM_SW_HI code, the SWITCH_HI code does not indicate that the preceding data was the end of a frame. Thus, a device receiving the SWITCH_HI code would know that a portion (e.g., the remainder) of the interrupted low priority frame should be received at some point after the high priority transmission is complete. In a similar manner, a SWITCH_LO code tells the receiver that low priority data follows. In a further example, SWITCH_LO codes are not utilized because the system is designed to transmit complete high priority frames only, i.e., high priority frames are not interrupted. In general, these codes are not part of the frame itself, but are separate data blocks or messages transmitted from the switching fabric.

Priority selection circuit 840 generates the appropriate codes and controls the flow of frames and control code insertion via multiplexer 860. Additionally, the control codes can be inserted into the "to-line-card" data stream using a variety of other techniques. Also as noted above, various algorithms and techniques, i.e., a leaky bucket technique, can be used to guarantee that some amount of low priority traffic is transmitted. For a more detailed explanation of the transmission of data across fabric switch 500, refer to U.S. patent application Ser. No. 10/288,937, entitled "Prioritization and Preemption of Data Frames Over a Switching Fabric," filed Nov. 6, 2002, and naming Mick Jacobs and Michael Benning as inventors and which is hereby incorporated by reference herein in its entirety.

It is noted that the switch fabric described herein is only an exemplary switch fabric which may be used with the present invention. Variations of the presently described switch fabric, including other types of switch fabrics and switch fabric architectures may also be used.

From output buffer 550, the data frames are serially transmitted to line card 900 to be passed on to various network devices. Serialized data arrives from switch fabric 500 at a serial link interface 902 of FIG. 9. Serial link interface 902 de-multiplexes and regenerates incoming data into frames or portions thereof. A priority detection circuit 904 separates high priority frames form low priority frames and forwards frames to either high priority queue 906 or low priority queue 908. In the presently described embodiment, high priority queue 906 and low priority queue 908 are implemented as illustrated in FIG. 3A.

Priority detection circuit 904 monitors the data stream for priority level control codes (e.g., the SWITCH_HI, SWITCH_LO, DELM_SW_HI, and DELM_SW_LO codes, so as to separate the combined low and high priority streams into two distinct streams. Both control codes and data pass through unchanged to appropriate priority level receive state machines. In a typical implementation, priority detection circuit 904 monitors only those codes that switch between the two low and high priority streams. Whenever a stream-switching code is encountered, priority detection circuit 904 switches to the specified stream beginning with data following the stream switching code. As noted above, a switch can happen anywhere within a frame or between frames.

Data frames arrive at a forwarding engine 910 from high priority queue 906 and low priority queue 908. Forwarding engine 910 analyzes at least a portion of the frames to determine each frame's destination. For example, forwarding engine 910 can analyze a frames header to determine a corresponding destination address. From the destination address, forwarding engine 910 can determine which ports 912 through 920 to forward the frame to so that the frame is sent to the appropriate destination network device. It is noted that although the examples described herein focus on two priority levels, high and low, those having ordinary skill in the art will readily recognize that the devices and techniques of the present application can be extended to more than two priority levels.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
   A line card transmitting a first data stream to a switch fabric, said first data stream having a first priority;
   at any time during said transmission, interrupting said transmission of said first data stream;
   transmitting a first switch code;
   transmitting a second data stream to said switch fabric, said second data stream having a second priority;
   transmitting a second switch code; and
   resuming transmission of said first data stream, wherein
   the first switch code comprises at least one of an indication that the data following the first switch code has a different priority than the data preceding the first switch code and that the data preceding the first switch code is the last data of a frame, and
   the second switch code comprises at least one of an indication that the data following the second switch code has a different priority than the data preceding the second switch code and that the data preceding the second switch code is the last data of a frame.

2. The method of claim 1, further comprising:
   resuming transmission of said first data stream even though there is data of the second data stream to transmit to the switching fabric.

3. The method of claim 1, wherein
   said first priority is a low priority; and
   said second priority is a high priority.

4. The method of claim 1, further comprising
   stopping transmission of a frame of said first data stream after detection of a start of frame and prior to detection of an end of frame.

5. The method of claim 1, further comprising:
   storing data of said first data stream in a first FIFO; and
   storing data of said second data stream in a second FIFO.

6. The method of claim 5, wherein said interrupting of transmission of the first data stream comprises:
   upon detection of data in said second FIFO, interrupting said first data stream.

7. The method of claim 5, further comprising:
   receiving a data stream at a line card, said data stream comprising frames of said first data stream and frames of said second data stream; and
   detecting the priority of said frames of said data stream.

8. The method of claim 5 wherein
   the first and second FIFOs are implemented as circular FIFOs,
   the first and second FIFOs are implemented in a single memory, and
   a boundary between the first and second FIFOs is set by a pointer.

9. The method of claim 1 wherein transmission of the second data stream is interrupted to transmit a predetermined amount of bytes of data of said first data stream.

10. The method of claim 1, further comprising:
    stopping transmission of a frame of said second data stream after detection of a start of said frame and prior to detection of an end of said frame.

11. The method of claim 1, further comprising:
    counting bytes of the second data stream;
    wherein the second data stream is interrupted when the counted bytes of the second stream reaches a predetermined number.

12. The method of claim 1, wherein the second data stream is interrupted after a certain time period elapses without transmission of data of the second data stream.

13. An apparatus comprising:
    a first buffer configured to store data of a first data stream prior to transmission to a switching fabric, said data of said first data stream having a first priority;
    a second buffer configured to store data of a second data stream prior to transmission to the switching fabric, said data of said second data stream having a second priority;
    a priority switch circuit coupled to said first buffer and said second buffer, wherein said priority switch circuit is configured to, upon detection of data of said second data stream:
    interrupt a transmission of data of said first data stream from the first buffer at any time during said transmission;
    transmit a first switch code, wherein
    the first switch code comprises at least one of an indication that the data following the first switch code has a different priority than the data preceding the first switch code and that the data preceding the first switch code is the last data of a frame; transmit data of said second data stream from the second buffer; and
    transmit a second switch code, wherein
    the second switch code comprises at least one of an indication that the data following the second switch code has a different priority than the data preceding the second switch code and that the data preceding the second switch code is the last data of a frame; and resume transmission of said first data stream from the first buffer.

14. The apparatus of claim 13, wherein said priority switch circuit is configured to resume transmission of said first data stream even though the second buffer contains data of the second data stream to be transmitted.

15. The apparatus of claim 13 wherein said priority switch circuit is further configured to interrupt transmission of said first data stream during transmission of a packet of said first data stream from said first buffer.

16. The apparatus of claim 13 wherein said priority switch circuit is further configured to transmit a predetermined amount of bytes from said first buffer when the priority switch circuit resumes transmission of the first data stream.

17. The apparatus of claim 13 further comprising:
a port coupleable to a network device; and
a forwarding engine coupled between said port and each of said first and second buffers, said forwarding engine configured to forward frames of said first data stream to said first buffer and forward second frames of said second data stream to said second buffer.

18. The apparatus of claim 13 further comprising:
a serial link configured to serialize data received from said first and said second buffers and said priority switch circuit and transmit said serialized data to the switching fabric.

19. The apparatus of claim 13, further comprising counting bytes of the second data stream, wherein
the second data stream interrupted when the counted bytes of the second stream reaches a predetermined number.

20. The method of claim 13, wherein the second data stream is interrupted after a certain time period elapses without transmission of data of the second data stream.

21. An apparatus comprising:
a first buffer configured to store data of a first data stream prior to transmission to a switching fabric, said data of said first data stream having a first priority;
a second buffer configured to store data of a second data stream prior to transmission to the switching fabric, said data of said second data stream having a second priority; and
means for, upon detection of data in said second buffer, interrupting a transmission of said first data stream from the first buffer at any time during said transmission; and
means for transmitting a first switch code, wherein the first switch code comprises at least one of an indication that the data following the first switch code has a different priority than the data preceding the first switch code and that the data preceding the first switch code is the last data of a frame,
means for transmitting said second data stream to the switch fabric from the second buffer;
means for transmitting a second switch code, wherein the second switch code comprises at least one of an indication that the data following the second switch code has a different priority than the data preceding the second switch code and that the data preceding the second switch code is the last data of a frame; and
means for resuming transmission of said first data stream when there is data in the second buffer to transmit.

22. The apparatus of claim 21, further comprising
counting bytes of the second data stream, wherein
the second data stream interrupted when the counted bytes of the second stream reaches a predetermined number.

23. The apparatus of claim 21, wherein the second data stream is interrupted after a certain time period elapses without transmission of data of the second data stream.

24. An apparatus comprising:
a first buffer configured to store data of a first data stream prior to transmission to a switching fabric, said data of said first data stream having a first priority, wherein said switching fabric is comprised of a first crossbar, wherein said first crossbar is configured to receive said first data stream;
a second buffer configured to store data of a second data stream prior to transmission to said switching fabric, said data of said second data stream having a second priority, wherein said switching fabric is comprised of a second crossbar, wherein said second crossbar is configured to receive said second data stream; and
a priority switch circuit coupled to said first buffer and said second buffer, wherein said priority switch circuit is configured to, upon detection of data of said second data stream:
interrupt a transmission of data of said first data stream from the first buffer at any time during said transmission;
transmit a first switch code, wherein the first switch code comprises at least one of an indication that the data following the first switch code has a different priority than the data preceding the first switch code and that the data preceding the first switch code is the last data of a frame; transmit data of said second data stream from the second buffer; transmit a second switch code, wherein the second switch code comprises at least one of an indication that the data following the second switch code has a different priority than the data preceding the second switch code and that the data preceding the second switch code is the last data of a frame; and resume transmission of said first data stream.

25. The method of claim 24 wherein said priority switch circuit is further configured to interrupt said transmission of said second data stream from the second buffer to resume transmission of said first data stream from the first buffer.

\* \* \* \* \*